(12) United States Patent
Herz

(10) Patent No.: US 8,004,565 B2
(45) Date of Patent: Aug. 23, 2011

(54) SYSTEM AND METHOD FOR USING MOTION VECTORS FOR OBJECT TRACKING

(75) Inventor: William S. Herz, Hayward, CA (US)

(73) Assignee: Nvidia Corporation, Santa Clara, CA (US)

(*) Notice: Subject to any disclaimer, the term of this patent is extended or adjusted under 35 U.S.C. 154(b) by 933 days.

(21) Appl. No.: 10/465,361

(22) Filed: Jun. 19, 2003

(65) Prior Publication Data

US 2004/0258152 A1    Dec. 23, 2004

(51) Int. Cl.
*H04N 5/225*    (2006.01)
(52) U.S. Cl. .......................... 348/169; 348/161
(58) Field of Classification Search ............. 375/240.16; 348/169
See application file for complete search history.

(56) References Cited

U.S. PATENT DOCUMENTS

| | | | |
|---|---|---|---|
| 5,588,067 A | 12/1996 | Peterson et al. | |
| 5,996,023 A | 11/1999 | Winter et al. | |
| 6,169,573 B1 * | 1/2001 | Sampath-Kumar et al. | 348/169 |
| 6,359,560 B1 | 3/2002 | Budge et al. | |
| 6,421,080 B1 | 7/2002 | Lambert | |
| 6,437,819 B1 * | 8/2002 | Loveland | 348/143 |
| 6,512,537 B1 | 1/2003 | Shimizu et al. | |
| 6,867,799 B2 * | 3/2005 | Broemmelsiek | 348/169 |
| 6,993,158 B2 * | 1/2006 | Cho et al. | 382/103 |
| 7,015,976 B1 * | 3/2006 | Orr et al. | 348/578 |
| 7,095,786 B1 * | 8/2006 | Schonfeld et al. | 375/240.16 |
| 7,113,616 B2 * | 9/2006 | Ito et al. | 382/103 |
| 7,248,294 B2 * | 7/2007 | Slatter | 348/240.99 |

OTHER PUBLICATIONS

International Organization for Standardisation ISO/IEC JTC1/SC29/WG11 Coding of Moving Pictures and Audio—N4668, *Overview of the MPEG-4 Standard*, Mar. 2002, pp. 1-78 at http://mpeg.telecomitalialab.com/standards/mpeg-4/mpeg-4.htm.

* cited by examiner

*Primary Examiner* — Mehrdad Dastouri
*Assistant Examiner* — Jeremaiah Hallenbeck-Huber
(74) *Attorney, Agent, or Firm* — Cooley LLP

(57) ABSTRACT

A system and method for tracking objects between multiple frames of a video is described. One method for tracking objects begins with a viewer initially identifying an object in a frame of video. If the viewer requires zooming, he can also select a scale factor for the identified object. Once the user has identified an object for tracking, the computer system identifies a reference point on the object and identifies the motion vectors for that reference point. Using the motion vectors, the computer system can track the identified object as it moves across the screen and can reposition an image acquisition area to track the location of the identified object in subsequent video frames.

22 Claims, 9 Drawing Sheets

SYSTEM AND METHOD FOR USING MOTION VECTORS FOR OBJECT TRACKING

FIELD OF THE INVENTION

The present invention relates to computer graphics. In particular, but not by way of limitation, the present invention relates to systems and methods for utilizing motion vectors to track objects through multiple frames of video data.

BACKGROUND OF THE INVENTION

Recent advances in DVD players have resulted in several useful features for consumers, security systems, and video production professionals. One of the more interesting features that has arisen is the "zoom" feature. Using the zoom feature, a viewer can select a portion of an image and scale that portion of the image to virtually any size. For example, a viewer could pause the playback of a DVD and select a region of the displayed image that includes the face of a particular actor. The viewer can then scale that region and position it in the center of the display so that the actor's face is enlarged and centered on the display.

Unfortunately, with current zoom technologies, the actor's face cannot necessarily remain as the center of the zoom when the video playback continues. For example, as the actor walks across the screen, current zoom features do not automatically follow the actor's face. Instead, the zoom feature remains centered on a single region of the screen regardless of what may or may not be in that region. Consequently, as the video play back advances, the actor can walk out of the zoomed-in region, and the viewer will lose the close-up view of the actor's face. If the viewer wants to zoom-in on the actor's face again, the viewer must restart the zoom process. That is, the viewer again needs to pause the video playback, select a region around the actor's face, and select a scaling factor.

Obviously, forcing a viewer to repeatedly acquire and reacquire the same image only in different video frames greatly reduces the attractiveness and usefulness of the zooming feature. A viewer would prefer to select an object, such as an actor's face, and stay centered on that object as the video playback advances. That is, as the actor walks across the screen, the zoom feature should automatically track the actor. Because no current technology satisfactorily addresses this issue, a system and method are needed to assist a viewer in tracking an object during video playback.

SUMMARY OF THE INVENTION

The present invention, in one embodiment, can provide a system and method for tracking objects through multiple video frames during video playback or other progression through video data. In one exemplary embodiment, the present invention can include a video playback/progression system, such as a DVD player, and an attached computer system that includes graphics processing capabilities such as those provided by a graphics processing unit (GPU). Other embodiments include an integrated system that functions primarily as a DVD player or a home entertainment system.

One method for tracking objects begins with a viewer initially identifying an object in a frame of video. For example, the viewer could draw a rectangle (referred to as a "pixel acquisition area") around an actor's face using standard computer tools such as a mouse and a graphics program. If the viewer requires zooming, he can also select a scale factor for the identified object. Once the user has identified an object for tracking, the computer system identifies a reference point on the object, such as the edges of the object, and identifies the motion vectors for that reference point. These motion vectors can be the type associated with standards developed by the Moving Picture Experts Group (MPEG). Using the motion vectors, the computer system can track the identified object as it moves across the screen and can reposition the image acquisition area, e.g., the rectangle, accordingly. That is, as the actor walks from one side of the screen to the other in the original video, the computer system can maintain the zoom on the actor's face.

The teachings of the technology described herein can be employed in several different ways. It should be understood, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
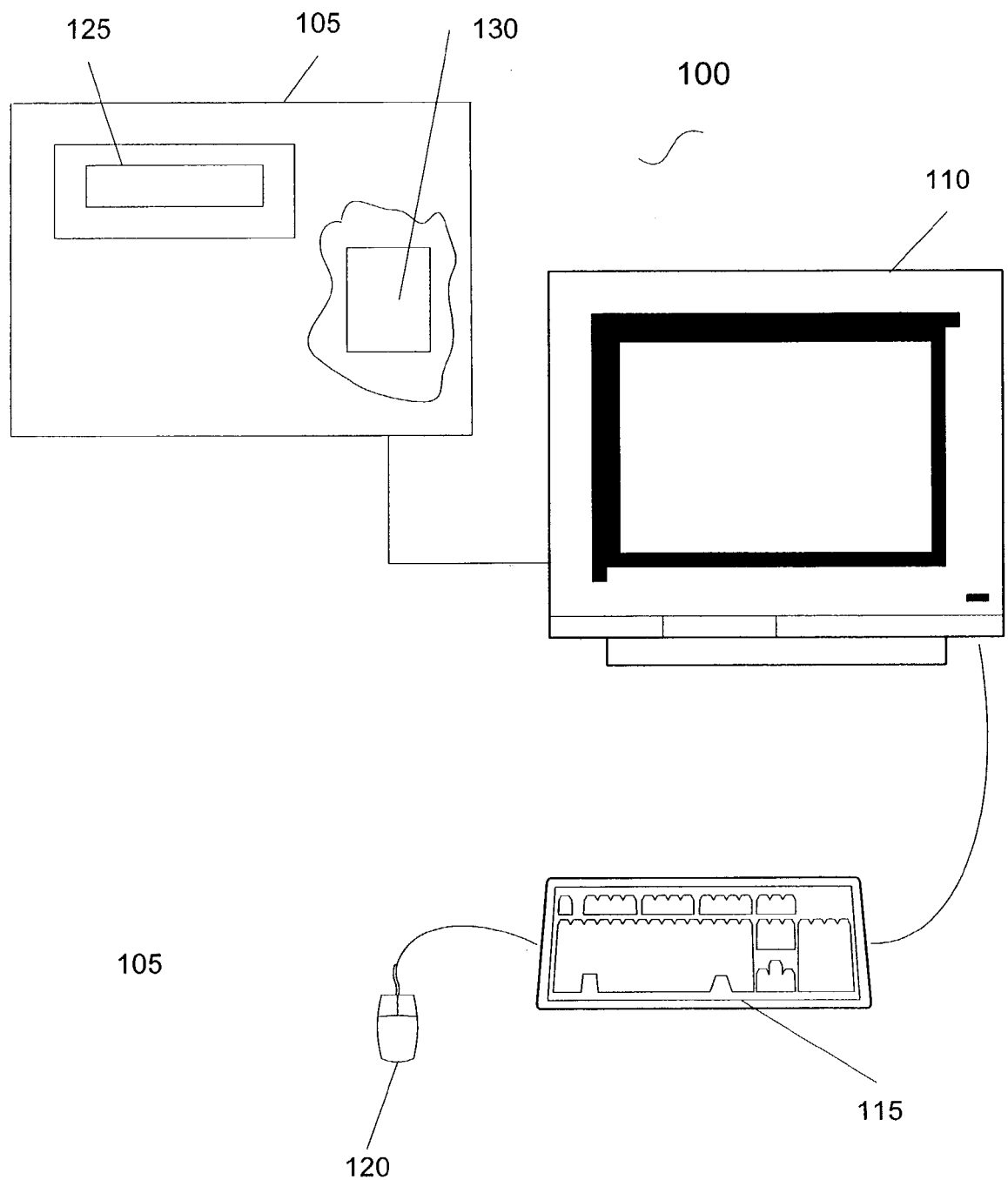
FIG. 1 illustrates a block diagram of one embodiment of a system constructed in accordance with the principles of the present invention.

Referring now to the drawings, where like or similar elements are designated with identical reference numerals throughout the several views, and referring in particular to FIG. 1, it illustrates a block diagram of one embodiment of a system 100 constructed in accordance with the principles of the present invention. This embodiment includes a computer 105 connected to a display 110, a keyboard 115 and a mouse 120. The input device could also include various remote control systems. The computer 105 could be of virtually any type, including personal computers, networked terminals, and work stations. This particular computer 105 includes a video playback device 125, such as a DVD player. Note that the video playback device could be any type of system for playing or progressing through video data. The computer 105 also includes a graphics processing unit (GPU) 130, such as those provided by NVIDIA, located in Santa Clara, Calif. The GPU 130 could function as a DVD decoder. The computer could include a DVD decoder chip or a CPU running a soft DVD decoder in addition to or instead of the GPU 130. The computer 105 and video playback device 125 player offer a viewer the ability to zoom-in on regions of an image and to track objects between multiple video frames.

Figure 2:
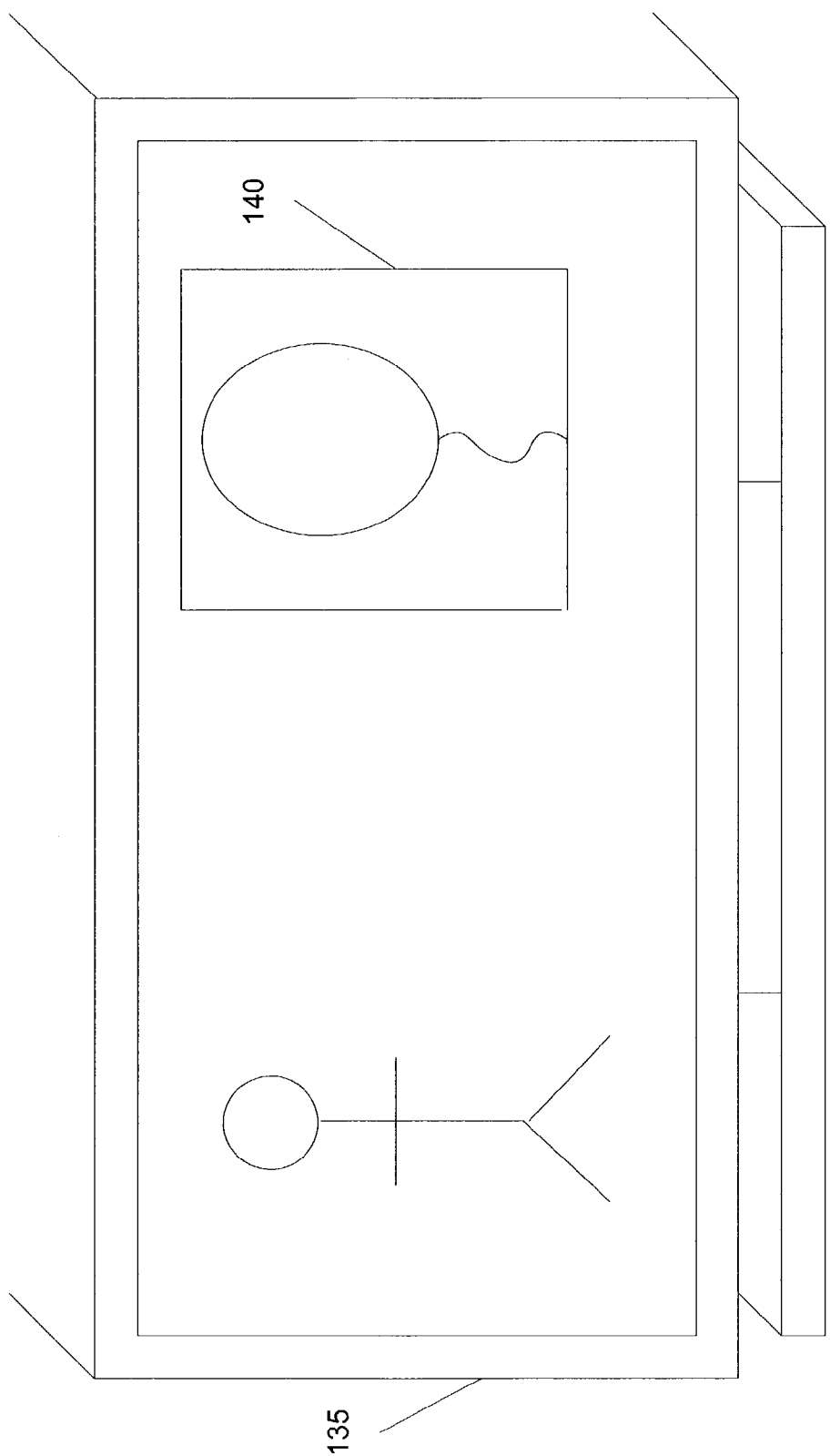
FIG. 2 illustrates a display device on which a region has been selected for zooming.

Referring now to FIG. 2, it illustrates a display device 135 on which a region 140 has been selected for zooming. The image shown in the display is a single frame of a video. The frame, for example, could be acquired from the video playback unit 125 (shown in FIG. 1). The video frame could also be acquired from a stream of data originating from a remote system (not shown).

The rectangle around the balloon portion of the image indicates a region 140 selected by the viewer. This region is referred to as a "target region" 140 or a "pixel acquisition area." The viewer can select the target region 140 by using the mouse 120 (shown in FIG. 1) or any other user input device. Once the target region 140 has been identified, the viewer can copy, scale, and/or track the region 140 or particular objects within the region 140 between multiple video frames.

Figure 3:
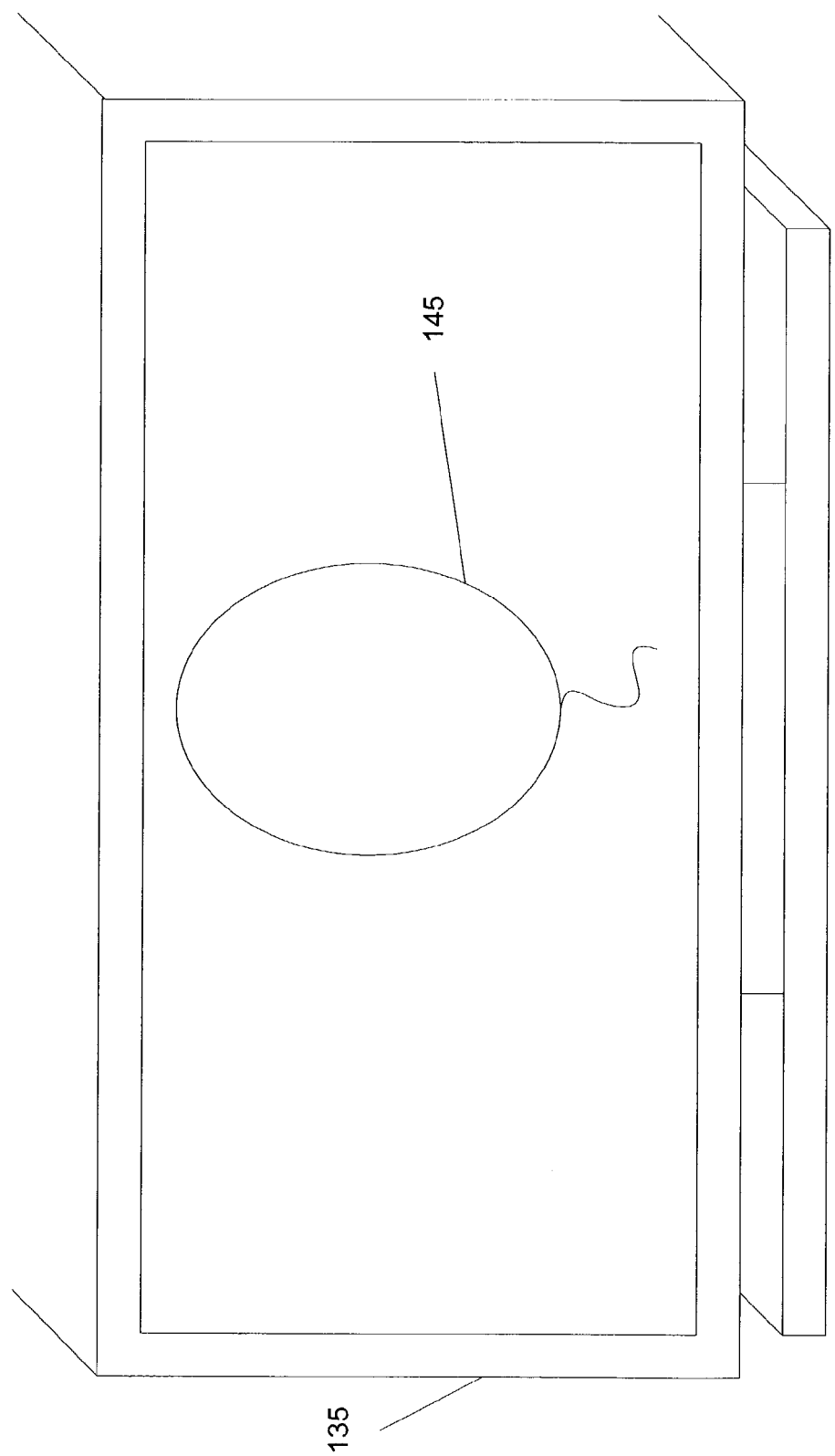
FIG. 3 illustrates a display device that is displaying the region of FIG. 2 that has been selected for zooming.

Referring now to FIG. 3, it illustrates a display device 135 that is displaying the target region 140 after scaling. Note that the object 145, i.e., the balloon, is both enlarged and repositioned to the center of the display. In current zooming technologies, if the balloon 145 moves to the left in subsequent video frames, the balloon will "drift" out of the zoomed region and may no longer be visible.

Figure 4:
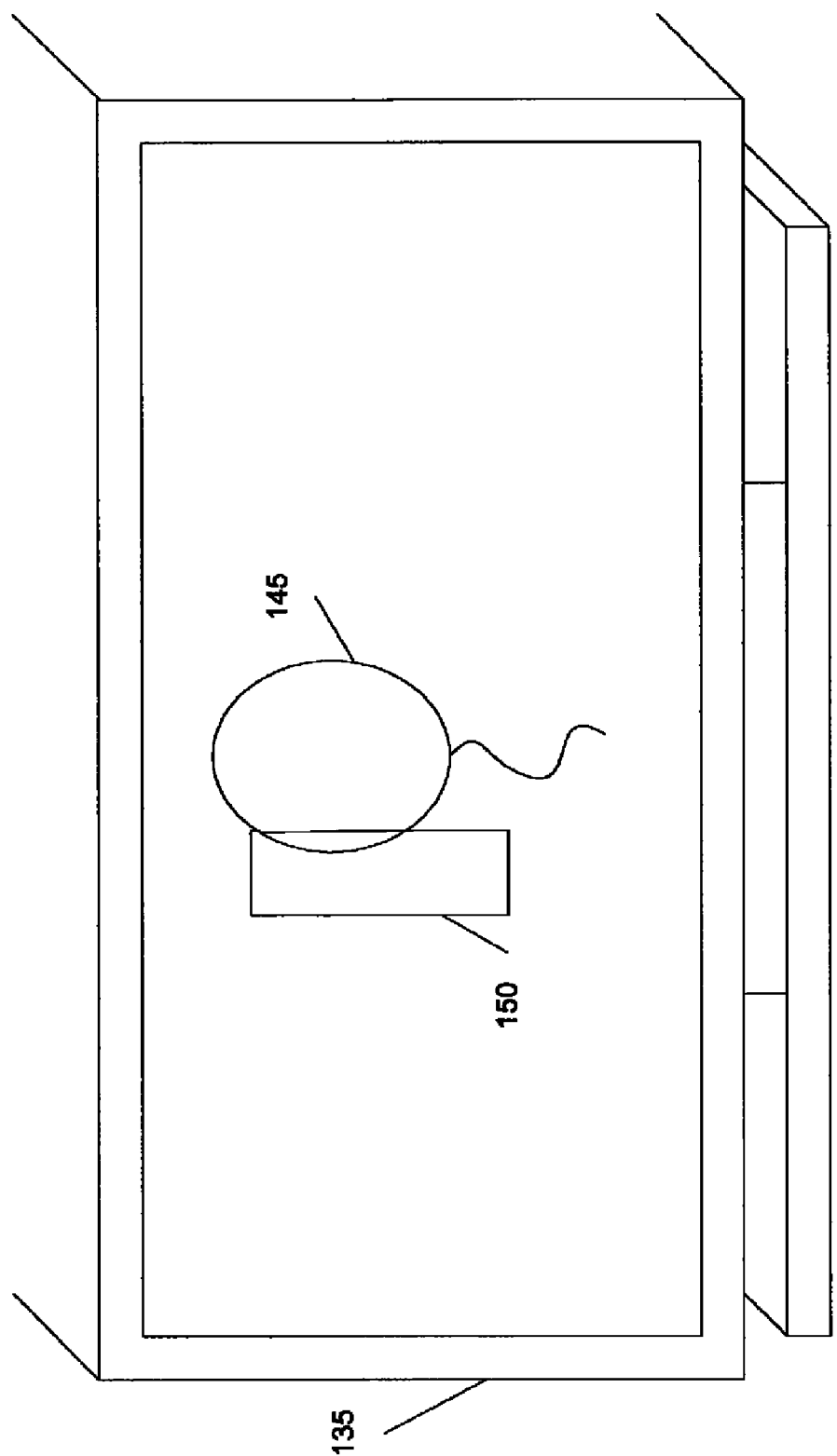
FIG. 4 illustrates a display device that is displaying a region that has been selected for tracking.

Referring now to FIG. 4, it illustrates a display device 135 displaying the balloon 145 also shown in FIG. 3. The displayed image of FIG. 4, however, includes a displayed rectangle 150 around an area of the image that should be tracked between video frames. The area within the rectangle 150 is referred to as the "tracked region" and the objects, such as the balloon 145, within the rectangle are referred to as "tracked objects." Tracked objects are not always associated with tracked regions and/or target regions.

The viewer can identify tracked regions and/or tracked objects using any of the well known techniques for identifying portions of an image. Additionally, a computer can identify a tracked object within a tracked region using well-known techniques such as edge identification. For example, the computer may identify the blocks that include the edge of the balloon 145. The motion vectors associated with these blocks indicate the motion of the edge of the balloon 145 and very likely the motion of the entire balloon 145. In certain embodiments, the viewer may be allowed to choose a particular object from several possible objects within a tracked region. For example, if the tracked region includes two balloons that are moving in different directions, the viewer could select one particular balloon to track.

Figure 5:
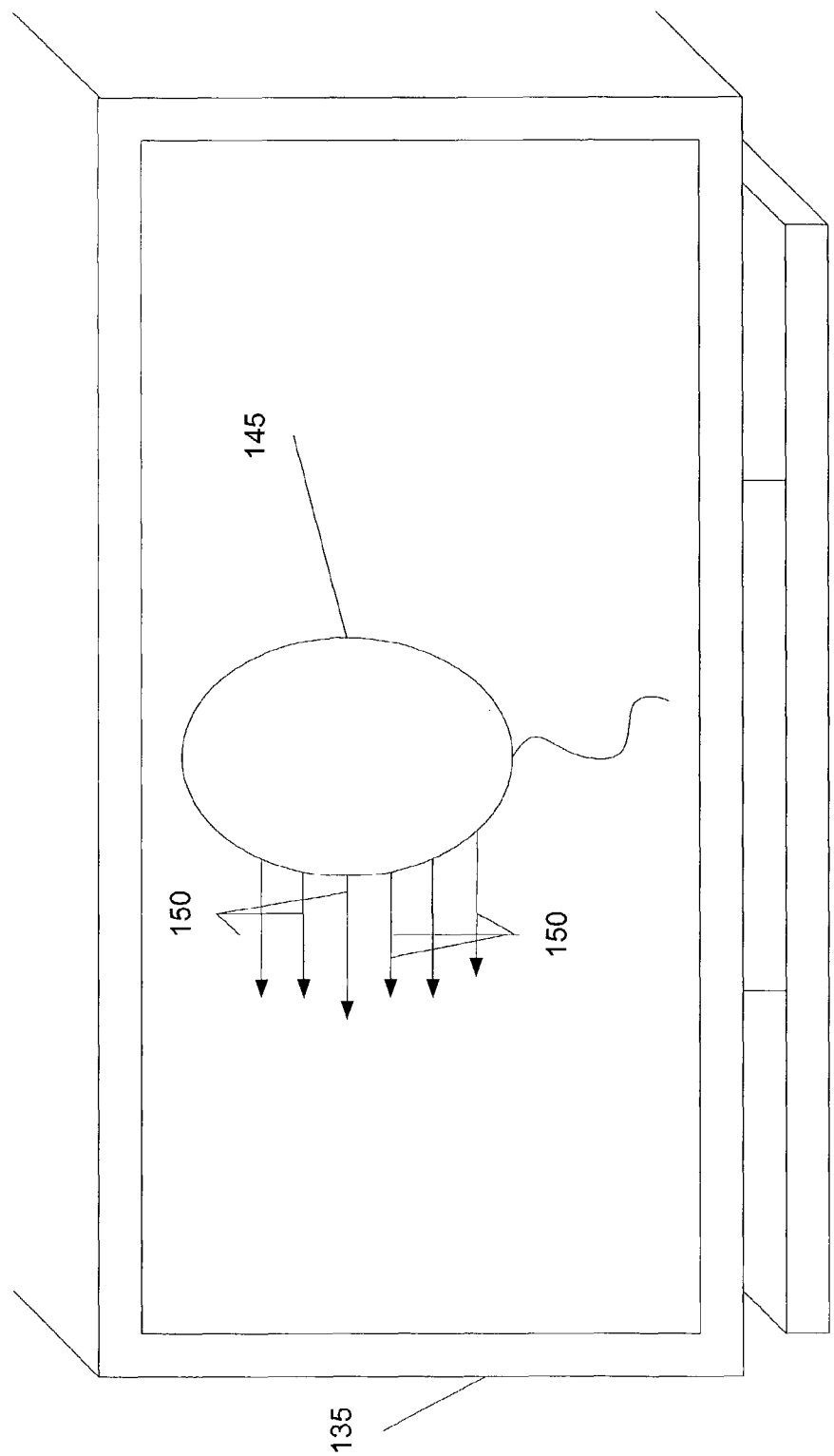
FIG. 5 illustrates a display device and the motion vectors associated with a tracked region.

Referring now to FIG. 5, it illustrates a display device 135 and the motion vectors 150 associated with the tracked region of FIG. 4. (FIG. 5 is for illustration purposes only. The illustrated motion vectors 150 are not generally visible to the viewer.) The motion vectors 150 indicate the direction and distance of movement for an object or edge between video frames. The motion vectors 150 in FIG. 5 indicate that the edge of the balloon 145 is moving from right to left during the video playback. A computer can use these motion vectors 150 to recenter the balloon, e.g., shift the target region, within the display regardless of the balloon's position in subsequent video frames.

Figure 6:
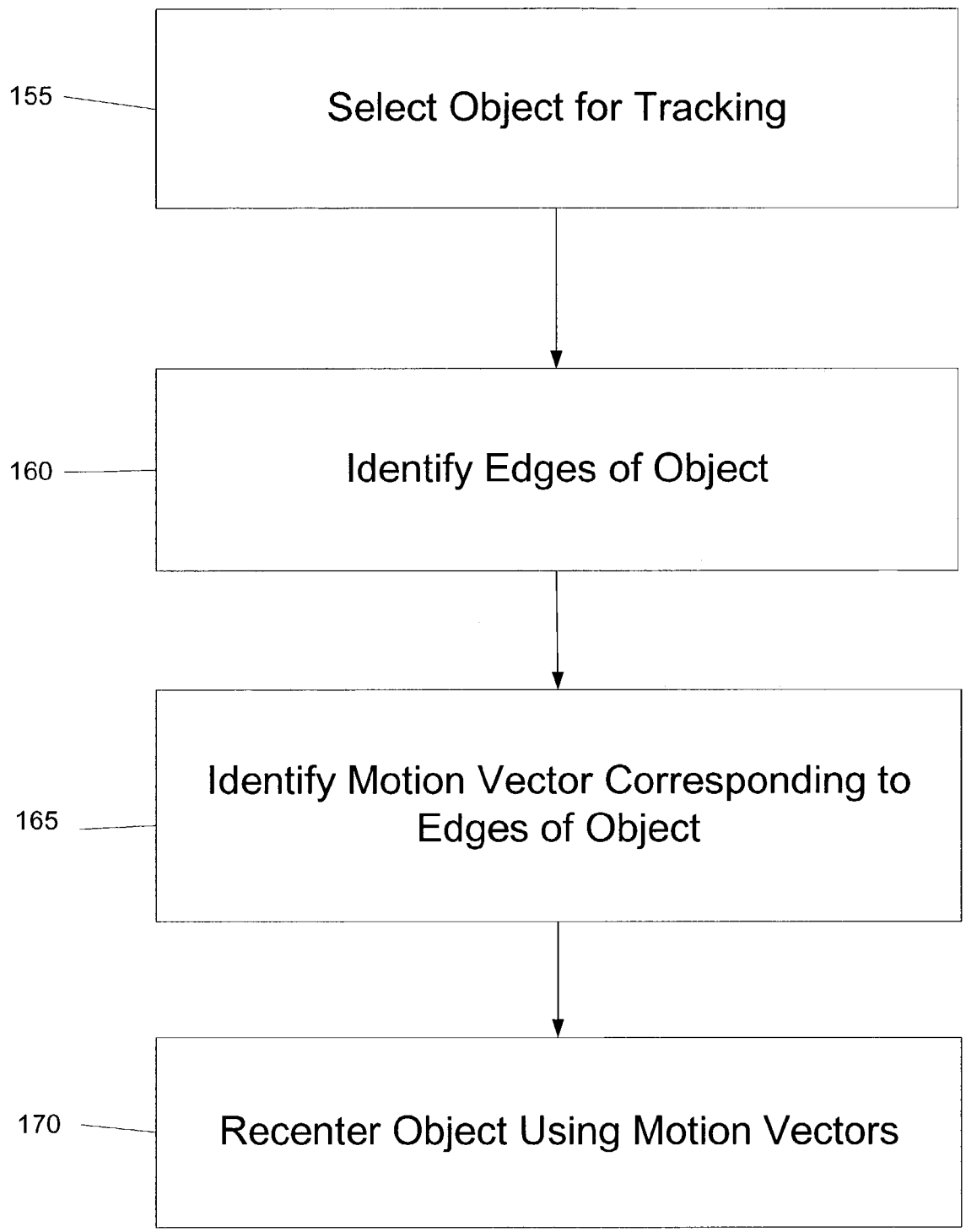
FIG. 6 is a flowchart of one method for tracking an object between multiple frames of a video.

Referring now to FIG. 6, it is a flowchart of one method for tracking an object between multiple frames of a video. For example, these steps describe one method for tracking the balloon of FIG. 2 through multiple video frames, thereby keeping the balloon centered on the display device regardless of the balloon's actual position. Zooming may or may not be used in conjunction with tracking.

To track the balloon, or any other object, a tracked region can be initially identified. (Block 155) The viewer, the computer, or a combination of the viewer and computer can identify a tracked region. For example, the user could select a target region of a displayed image, and the computer could then identify the potentially trackable objects within that target region using known techniques such as edge identification or object identification. (Block 160) The computer can then set these identified objects as the tracked objects or the viewer can manually select one of the objects to become the target object. In other embodiments, the viewer directly selects a trackable object or an edge of a trackable object without selecting a target region. For example, the viewer could directly select the left edge of the balloon for tracking. The computer can then identify the remaining edges of the balloon so that the entire balloon can be tracked.

In another embodiment, the computer automatically selects a tracked region based on triggering events such as objects moving between video frames. For example, when a person changes his position from one video frame to another, the computer could select the region around the person as the tracked region. The computer could determine that the person changed position by analyzing the motion vectors associated with the video data.

Once a tracked object has been selected, the motion vectors associated with the tracked object are identified. (Block 165) For example, the computer could identify the blocks that form the edge of the tracked object and then identify the motion vectors that are associated with that block. Because motion vectors are commonly used in decoding digital video data—especially for MPEG video data—techniques for identifying and processing such vectors are well known and not discussed herein.

Using the identified motion vectors, the computer can determine the distance and direction of movement for the tracked object between video frames. The computer can then realign the image—e.g., shift the pixel acquisition area—to keep the tracked object in the center of the display even if the tracked object would have otherwise moved away from the center of the display in subsequent video frames. (Block 170) That is, even if the original video data shows the balloon moving from left to right across the display, the computer would center the display of the balloon by shifting the pixel acquisition area to match the object's motion.

Figure 7:
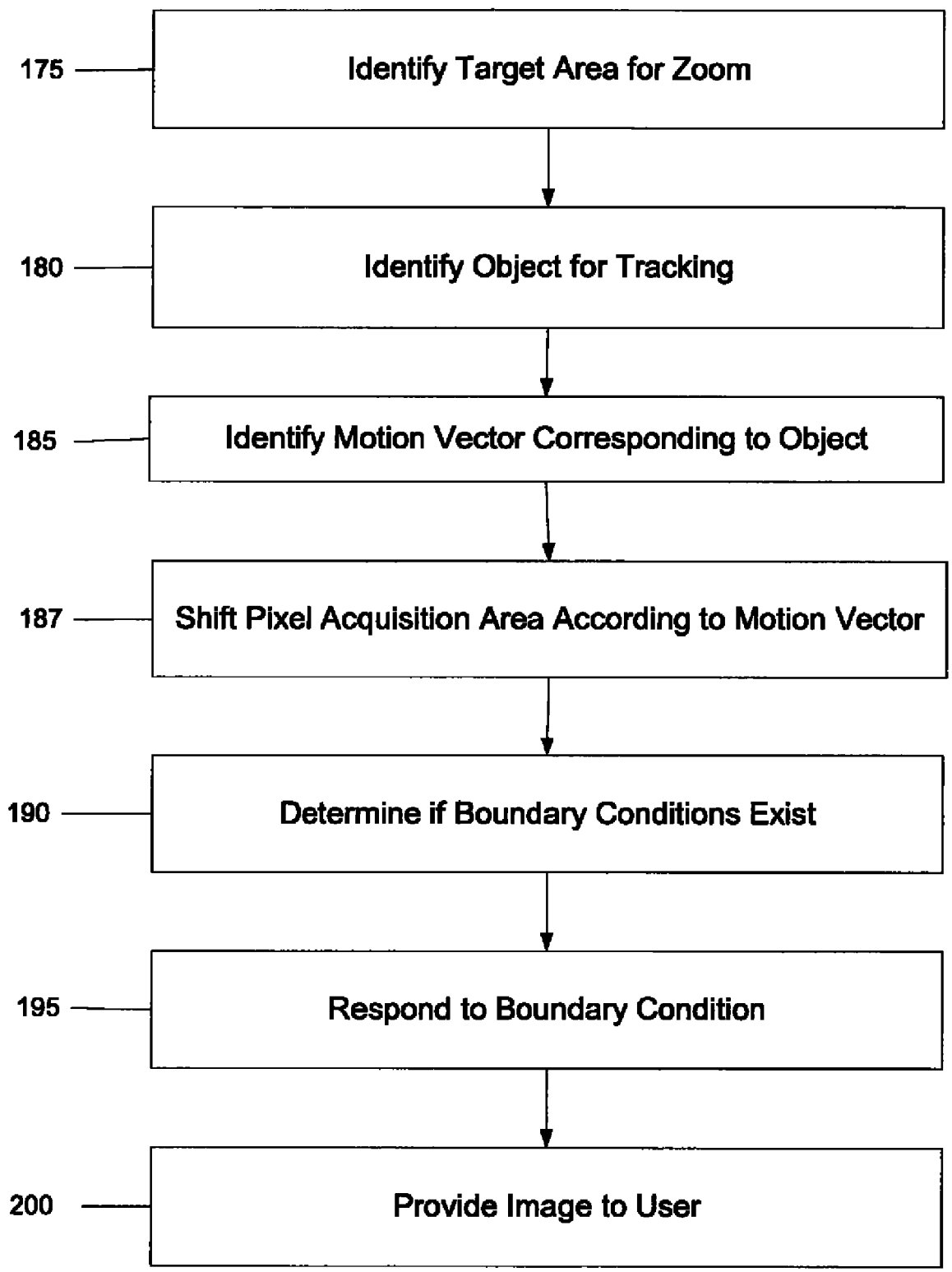
FIG. 7 is a flowchart of another method for tracking an object between multiple frames of a video.

Referring now to FIG. 7, it is a flowchart of another method for tracking an object between multiple frames of a video. In this embodiment, the viewer initially selects the target region of a displayed image on which to zoom-in, e.g., the area around a face. (Block 175) The viewer (or computer) can then select a particular object, e.g., eyes, within that region for tracking. (Block 180) Once the object to track has been identified, the computer identifies the motion vectors associated with the object, the edge of the object, or some other reference point in the object. (Block 185) Using the motion vectors, the computer can shift the target region to track the movement of the object. (Block 187) The computer can also scale the pixel acquisition area to full display—including standard TV, DTV, and HDTV.

If the tracked object or some portion of the tracked object is no longer visible in subsequent video frames, a boundary condition may have been encountered, and the computer can address the boundary condition as appropriate. (Block 190) Typical boundary conditions include the object moving out of the image, the object being occluded by some other object, or the object not being present in a subsequent scene. Boundary conditions can be addressed by canceling the zoom/track function and returning to normal viewing. Alternatively, boundary conditions can be addressed by a series of rules based on the length of time that an object is not visible. (Block 195) For example, the zoom and tracking function may remain locked on the last known location for the tracked object for a limited period of time. If the object does not become visible within that period of time, then the zoom and/or tracking function can be canceled. Alternatively, the computer could store the image of the tracked object and restart the zoom and/or tracking function if the tracked object is identified in a subsequent video frame.

Assuming that no boundary condition has occurred and that the tracked object is still visible, the scaled version of the tracked object can be transmitted to the viewer. If a boundary condition exists, the image provided to the viewer is determined by the type of boundary condition and the rules defined for handling that type of boundary condition. (Block 200)

Figure 8:
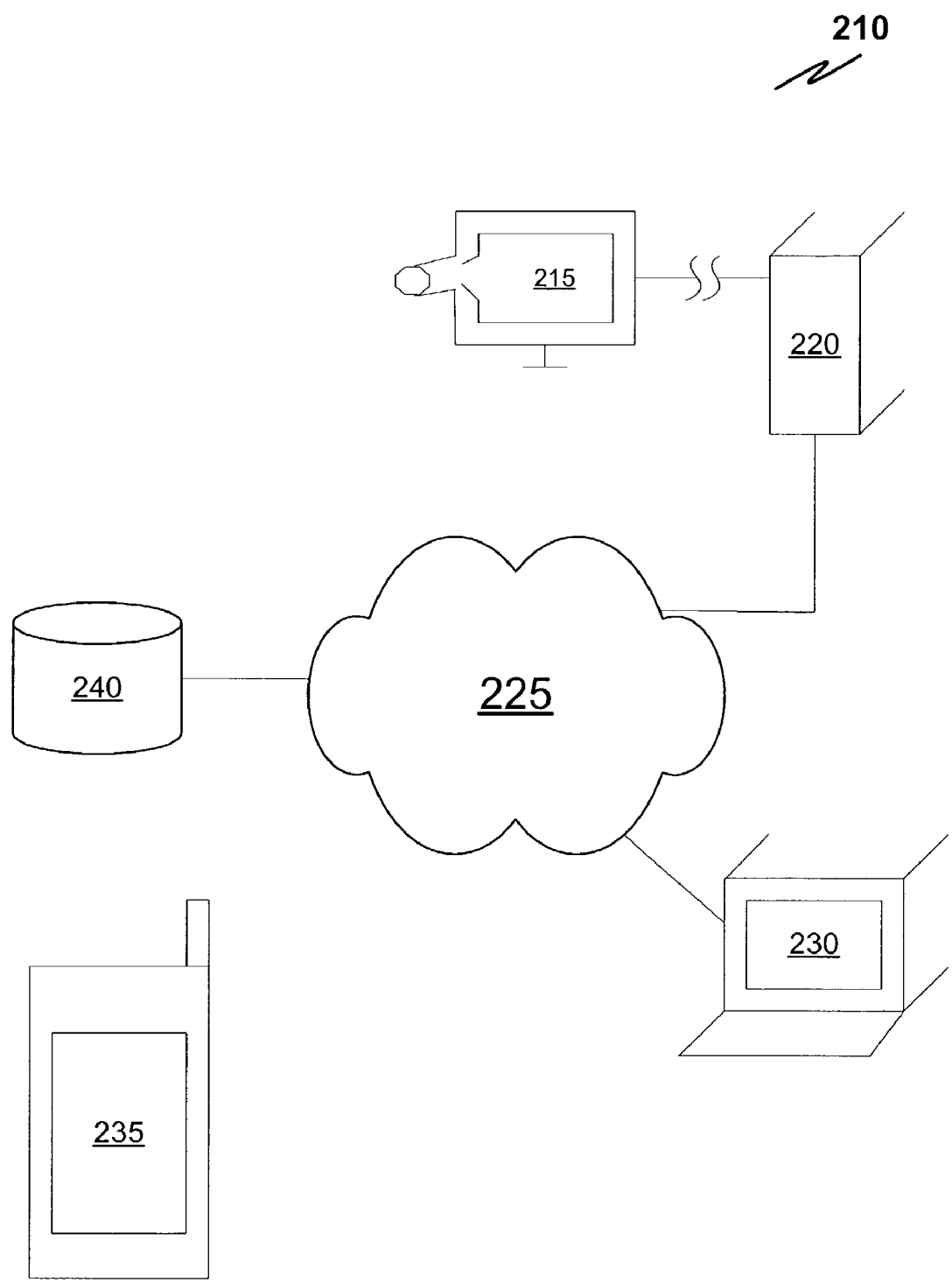
FIG. 8 illustrates a block diagram of a system for using motion vectors to process data captured by a video camera.

Referring now to FIG. 8, it illustrates a block diagram of a system 210 for using motion vectors to process data captured by a "live" video camera. In this particular embodiment, a video camera 215 captures video data and provides that data to a video-processing center 220. The video-processing center 220 can be a typical personal computer, a networked terminal, a workstation, or any other type of computing device. The video-processing center can typically encode or compress the received video data with motion vectors, or the video camera 215 may have the ability to encode the video data directly.

In either of the above cases, the video-processing center 220 analyzes video data for the presence of motion vectors. The identification of certain motion vectors could indicate that the video camera 215 is recording movement of some object. In essence, the video-processing unit 220 is acting as a motion detector by identifying motion vectors that are present or encoded into the video data captured by the video camera 215. As previously indicated, the raw video data captured by the video camera 215 may not include motion vectors. These motion vectors may be added to the raw video data during subsequent processing. The video-processing center 220 can identify these motion vectors on-the-fly or subsequently, such as during playback.

Responsive to identifying certain motion vectors, the video-processing center 220 can reposition, either virtually of by sending control signals to the camera, the video camera 215, mark the video data with an event marker, and/or generate an alarm condition that can be sent over the network 225 to a device such as device 230 or wireless device 235. Alternatively, the video-processing center 220 could begin recording the video data on a storage device 240 or start recording at a higher quality.

Figure 9:
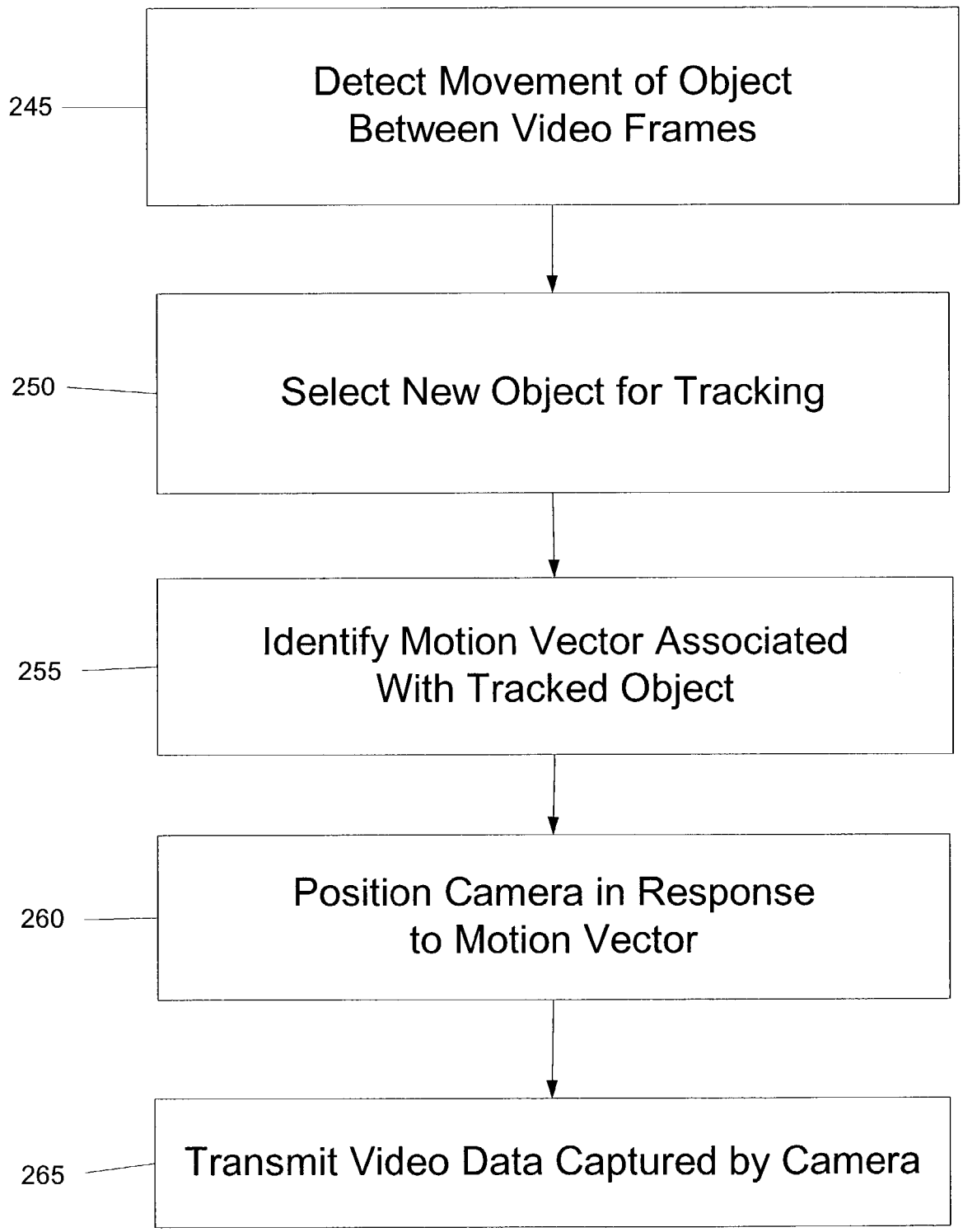
FIG. 9 is a flowchart of one method for controlling a video capturing system using motion vectors.

Referring now to FIG. 9, it is a flowchart of one method for operating a video capturing system, such as the one shown in FIG. 8. In this embodiment, the video-processing center detects movement of an object between video frames by identifying motion vectors in the video data. (Block 245) The video-processing unit selects that object for tracking and, in some embodiments, identifies the edges of the object. (Block 250) Using the motion vectors, or at least some of the motion vectors, associated with the tracked object, the video-processing center can reposition the video camera so that it tracks the moving object. (Blocks 255 and 260) The video data can then be transmitted to a viewer or a storage device. (Block 265)

In another embodiment, the video-processing center selects a target region around the tracked object, locks onto that object, compresses the image data associated with the object and transmits that compressed data to the user or to a storage device. Data compression is not necessary in all embodiments. In essence, the video-processing center can eliminate irrelevant portions of the image captured by the video camera and transmit only the target region to the viewer or to a storage device. For example, the video-processing center could transmit the image of the person approaching the door instead of the image of the person and all of the background scenery normally captured by the video camera. This embodiment is particularly useful when bandwidth or storage capacity is limited.

In conclusion, the present invention provides, among other things, a system and method for tracking objects through multiple frames of a video. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed:

1. A method for tracking objects in video data during video playback, the method comprising:
   acquiring video frames from a video playback device as a source of previously captured video frames;
   designating a target region within a first previously captured video frame;
   automatically identifying, subsequent to designation of the target region, an object included within the target region;
   performing a zoom modifying the display size of the identified object within the target region in response to input from a user selecting a zoom action;
   identifying a motion vector associated with the identified object, the motion vector being associated with a second previously captured video frame and at least a portion of the identified object being included in the second previously captured video frame;
   shifting the target region for the second previously captured video frame according to the identified motion vector and according to a series of time-based rules for addressing boundary conditions to re-center the target region in a display device for the second previously captured video frame, the time-based rules including:
      providing an indication that the identified object is not visible, and
      waiting a limited period of time after the indication to determine if the identified object becomes visible; and
   automatically preserving the user-selected action modifying the display size of at least a portion of the identified object within the shifted target region when the identified object becomes visible after the limited period of time following the indication;
   wherein the identified object is tracked and a zoomed version of the identified object is re-centered in the display device for the second previously captured video frame.

2. The method of claim 1, further comprising:
   determining at least a portion of the perimeter of the identified object.

3. The method of claim 2, wherein determining at least a portion of the perimeter comprises:
   determining an edge of the identified object;
   wherein the identified motion vector is associated with the edge.

4. The method of claim 1, further comprising:
determining a reference point for the object;
wherein the identified motion vector corresponds to the reference point.

5. The method of claim 1, wherein identifying a motion vector comprises:
extracting the motion vector from video data associated with the second video frame.

6. The method of claim 5, wherein identifying a motion vector comprises:
extracting the motion vector from MPEG-format video data associated with the second video frame.

7. The method of claim 1, further comprising:
providing image data included in the shifted target region to a viewer.

8. The method of claim 1, further comprising:
transmitting image data included in the shifted target region to a storage device.

9. The method of claim 8, wherein the image data is transmitted to a storage device responsive to identification of the motion vector.

10. The method of claim 1, further comprising:
determining if a boundary condition exists.

11. The method of claim 10, further comprising:
responsive to the determination that a boundary condition exists, recording identifying data for the object.

12. The method of claim 1, wherein a computer automatically designates the target region within the first video frame.

13. A system for tracking objects during video playback, the system comprising:
a processor;
a non-transitory memory device connected to the processor, the non-transitory memory device comprising a plurality of instructions configured to cause the processor to:
acquire video frames from a video playback device as a source of previously captured video frames;
designate a target region within a first previously captured video frame;
identify automatically, subsequent to designation of the target region, an object included within the first previously captured video frame;
perform a zoom modifying the display size of the identified object in response to input from a user selecting a zoom action;
identify a motion vector associated with the identified object as included in a second previously captured video frame; and
generate data for the display of the identified object as included in the second previously captured video frame such that the target region is shifted according to the identified motion vector and according to a series of time-based rules for addressing boundary conditions to re-center the target region for the second previously captured video frame in a display device and wherein the user-selected action modifying the display size of the identified object is automatically preserved within the shifted target region, the time-based rules including:
providing an indication that the identified object is not visible, and
waiting a limited period of time after the indication to determine if the identified object becomes visible;
wherein the identified object is tracked and a zoomed version of the identified object is re-centered in the display device for the second previously captured video frame.

14. The system of claim 13, wherein the plurality of instructions configured to cause the processor to identify an object comprises:
a plurality of instructions configured to cause the processor to determine at least a portion of he perimeter of the object.

15. The system of claim 13, wherein the plurality of instructions configured to cause the processor to generate data for the display of the identified object comprises:
a plurality of instructions configured to cause the processor to generate data that scales the object.

16. The system of claim 13, wherein the plurality of instructions configured to cause the processor to generate data for the display of the identified object comprises:
a plurality of instructions configured to cause the processor to generate data that centers a pixel acquisition area on the identified object as included in the second previously captured video frame.

17. The system of claim 13, further comprising:
an input device for designating the target region.

18. The system of claim 13, wherein the plurality of instructions configured to cause the processor to generate data for the display of the identified object comprises:
a plurality of instructions configured to cause the processor to scale the identified object to full screen.

19. The system of claim 18, wherein the plurality of instructions configured to cause the processor to scale the identified object to full screen comprises:
a plurality of instructions configured to discard image data in the second previously captured video frame that is not associated with the object.

20. The system of claim 13, wherein the action comprises a scaling action.

21. A method for tracking objects in video data during video playback, the method comprising:
acquiring video frames from a video playback device as a source of previously captured video frames;
designating a target region within a first previously captured video frame in response to input from a user;
automatically identifying, subsequent to designation of the target region, a plurality of potentially trackable objects within the target region;
receiving a selection from a user of a particular object among the plurality of potentially trackable objects;
performing a zoom modifying the display size of the particular object in response to input from the user selecting a zoom action;
identifying a motion vector associated with the particular object, the motion vector being associated with a second previously captured video frame and at least a portion of the particular object being included in the second previously captured video frame; and
shifting the target region for the second previously captured video frame according to the identified motion vector and according to a series of time-based rules for addressing boundary conditions to re-center the target region for the second previously captured video frame in a display device, the time-based rules including:
providing an indication that the identified object is not visible, and
waiting a limited period of time after the indication to determine if the identified object becomes visible; and
automatically preserving the user-selected action modifying the display size of at least a portion of the particular object within the shifted target region when the identified object becomes visible after the limited period of time following the indication;

wherein the identified object is tracked and a zoomed version of the particular object is re-centered in the display device for the second previously captured video frame.

22. The method of claim 21, wherein performing an action on the particular object comprises scaling the particular object.

* * * * *